US009849498B2

(12) United States Patent
Murata

(10) Patent No.: US 9,849,498 B2
(45) Date of Patent: Dec. 26, 2017

(54) STACKING APPARATUS AND STACK MANUFACTURING SYSTEM

(71) Applicant: HODEN SEIMITSU KAKO KENKYUSHO CO., LTD., Atsugi-shi, Kanagawa (JP)

(72) Inventor: Chikara Murata, Zama (JP)

(73) Assignee: HODEN SEIMITSU KAKO KENKYUSHO CO., LTD., Atsugi-Shi, Kangawa (JP)

( * ) Notice: Subject to any disclaimer, the term of this patent is extended or adjusted under 35 U.S.C. 154(b) by 445 days.

(21) Appl. No.: 14/425,417

(22) PCT Filed: May 30, 2013

(86) PCT No.: PCT/JP2013/065020
§ 371 (c)(1),
(2) Date: Mar. 3, 2015

(87) PCT Pub. No.: WO2014/038257
PCT Pub. Date: Mar. 13, 2014

(65) Prior Publication Data
US 2015/0224559 A1    Aug. 13, 2015

(30) Foreign Application Priority Data

Sep. 7, 2012  (JP) ................. 2012-196822

(51) Int. Cl.
*B23P 21/00* (2006.01)
*B21D 43/22* (2006.01)
(Continued)

(52) U.S. Cl.
CPC ............. *B21D 43/22* (2013.01); *B21D 28/02* (2013.01); *B21D 28/145* (2013.01);
(Continued)

(58) Field of Classification Search
CPC ............... B21D 43/22; Y10T 156/1056; Y10T 156/107; Y10T 29/5192; Y10T 29/5138;
(Continued)

(56) References Cited

U.S. PATENT DOCUMENTS 3,460,415 A * 8/1969 Christian ............... B21D 43/20
221/219
5,755,023 A * 5/1998 Neuenschwander .. B21D 28/02
29/596
(Continued)

FOREIGN PATENT DOCUMENTS

CN        1595771 A     3/2005
CN      102112249 A     6/2011
(Continued)

OTHER PUBLICATIONS

Machine Translation of JP 03-221221-A, which JP '221 was published Sep. 1991.*

(Continued)

*Primary Examiner* — Erica E Cadugan
(74) *Attorney, Agent, or Firm* — Sughrue Mion, PLLC

(57) ABSTRACT

To provide a stacking apparatus and a stack manufacturing system having high accuracy and productivity. A stacking apparatus 10 includes: a stage unit 4 on which a material to be stacked 90 is placed; a sandwiching member 11 that is vertically movable with respect to the stage unit 4, and between which and the stage unit 4 the material to be stacked 90 is sandwiched; a press member 13 that is vertically movable with respect to the sandwiching member 11 and presses the material to be stacked 90; and a guide pin 14 that guides a stack 91a pressed and stamped out of the material to be stacked 90 by the press member 13.

13 Claims, 10 Drawing Sheets

(51) Int. Cl.
  *B21D 28/02* (2006.01)
  *B21D 43/00* (2006.01)
  *H02K 15/02* (2006.01)
  *H01F 41/02* (2006.01)
  *B21D 28/14* (2006.01)
  *B21D 45/00* (2006.01)

(52) U.S. Cl.
  CPC .......... *B21D 45/003* (2013.01); *B23P 21/006* (2013.01); *H01F 41/024* (2013.01); *H02K 15/02* (2013.01); *B21D 43/003* (2013.01); *Y10T 29/513* (2015.01); *Y10T 29/5138* (2015.01); *Y10T 29/5142* (2015.01); *Y10T 29/5176* (2015.01); *Y10T 29/5192* (2015.01); *Y10T 29/5197* (2015.01); *Y10T 29/5317* (2015.01); *Y10T 29/53143* (2015.01); *Y10T 29/53978* (2015.01); *Y10T 156/107* (2015.01); *Y10T 156/1056* (2015.01)

(58) Field of Classification Search
  CPC .. Y10T 29/5143; H02K 15/02; H02K 15/022; H02K 15/024; H02K 15/026; H02K 15/028; H01F 41/02; H01F 41/0206; H01F 41/0213; H01F 41/022; H01F 41/0226; H01F 41/0233; H01F 41/024; H01F 41/0246; H01F 41/0253; H01F 41/026; H01F 41/0266; H01F 41/0273; H01F 41/028; H01F 41/0286; H01F 41/0293
  USPC ............ 156/252, 261; 29/33 L, 564.2, 564.7
  See application file for complete search history.

(56) References Cited

U.S. PATENT DOCUMENTS

| | | | |
|---|---|---|---|
| 6,682,625 B1* | 1/2004 | Futamura | B21D 28/02 156/252 |
| 6,829,815 B1 | 12/2004 | Henschel et al. | |
| 6,852,189 B2* | 2/2005 | Futamura | B21D 35/00 156/252 |
| 8,720,039 B2* | 5/2014 | Matsubara | B21D 28/02 226/118.2 |
| 2015/0231845 A1* | 8/2015 | Murata | B30B 9/301 100/215 |

FOREIGN PATENT DOCUMENTS

| | | |
|---|---|---|
| JP | 50-9887 U | 1/1975 |
| JP | 3-221221 A | 9/1991 |
| JP | 4-17998 A | 1/1992 |
| JP | 9-155798 A | 6/1997 |
| JP | 2000-263148 A | 9/2000 |
| JP | 2001-016832 A | 1/2001 |
| JP | 2002-045937 A | 2/2002 |
| JP | 2003-502985 A | 1/2003 |
| JP | 2003-304654 A | 10/2003 |
| JP | 2007-98411 A | 4/2007 |
| JP | 2012-139726 A | 7/2012 |

OTHER PUBLICATIONS

Notice of Rejection dated Jan. 11, 2017, from the Japanese Patent Office in counterpart Japanese application No. 2012-216794.
International Search Report for PCT/JP2013/065020 dated Aug. 27, 2013 [PCT/ISA/210].
Communication dated Mar. 1, 2017 from the Taiwanese Intellectual Property Office in counterpart Application No. 102125555.

* cited by examiner

STACKING APPARATUS AND STACK MANUFACTURING SYSTEM

CROSS REFERENCE TO RELATED APPLICATIONS

This application is a National Stage of International Application No. PCT/JP2013/065020, filed on May 30, 2013, which claims priority from Japanese Patent Application No. 2012-196822, filed on Sep. 7, 2012, the contents of all of which are incorporated herein by reference in their entirety.

TECHNICAL FIELD

The present invention relates to a stacking apparatus and a stack manufacturing system which stack and integrate a plurality of component members.

BACKGROUND ART

A stack manufacturing apparatus which progressively feeds a hooped long material to be machined in its longitudinal direction, forms relief holes within the outer contour of a stack or protrusions in positions corresponding to the relief holes at a plurality of stages, shapes component members having a predetermined outer contour by non-separating indentation machining into a state where at least part of the outer contour thereof is locked to the material to be machined, and successively presses out and stacks the component members, passes the projections through the relief holes in the lower component member (s), and welds the protrusions to another component member in a non-adjacent state for lamination and integration in the final stage of the progressive feeding of the material to be machined has conventionally been disclosed (see Patent Literature 1).

CITATION LIST

Patent Literature

Patent Literature 1: JP2002-45937A

DISCLOSURE OF THE INVENTION

Problems to be Solved by the Invention

An object of the present invention is to provide a stacking apparatus and a stack manufacturing system having even higher accuracy and productivity.

Means for Solving the Problems

A stacking apparatus of one embodiment according to the present invention includes:
a stage unit on which a material to be stacked is placed;
a sandwiching member that is vertically movable with respect to the stage unit, and between which and the stage unit the material to be stacked is sandwiched;
a press member that is vertically movable with respect to the sandwiching member and presses the material to be stacked; and
a guide pin that guides a stack pressed and stamped out of the material to be stacked by the press member.
In a stacking apparatus of one embodiment according to the present invention,
the guide pin is inserted through a hole formed in the stack and guides the stack.

A stacking apparatus of one embodiment according to the present invention includes an elastic member that elastically supports the guide pin.

A stacking apparatus of one embodiment according to the present invention includes:
a rotating stage unit on which a first material to be stacked is placed in a first position and a second material to be stacked is placed in a second position;
a first sandwiching member that is vertically movable with respect to the rotating stage unit in the first position, and between which and the rotating stage unit the first material to be stacked is sandwiched;
a first press member that is vertically movable with respect to the first sandwiching member and presses the first material to be stacked;
a first guide pin that guides a first stack pressed and stamped out of the first material to be stacked by the first press member;
a second sandwiching member that is vertically movable with respect to the rotating stage unit in the second position, and between which and the rotating stage unit the second material to be stacked is sandwiched;
a second press member that is vertically movable with respect to the second sandwiching member and presses the second material to be stacked; and
a second guide pin that guides a second stack pressed and stamped out of the second material to be stacked by the second press member.

In a stacking apparatus of one embodiment according to the present invention,
the first guide pin is inserted through a first hole formed in the first stack and guides the first stack, and
the second guide pin is inserted through a second hole formed in the second stack and guides the second stack.

A stacking apparatus of one embodiment according to the present invention includes:
a first elastic member that elastically supports the first guide pin; and
a second elastic member that elastically supports the second guide pin.

In a stacking apparatus of one embodiment according to the present invention,
the rotating stage unit includes:
a guide base on which the first stack and the second stack stamped out are placed; and
an actuator that vertically moves the guide base.

In a stacking apparatus of one embodiment according to the present invention,
the rotating stage unit includes at least two guide bases and actuators.

A stacking apparatus of one embodiment according to the present invention includes:
a first cutting unit that cuts off a first scrap portion of the first material to be stacked from which the first stack has been stamped out; and
a second cutting unit that cuts off a second scrap portion of the second material to be stacked from which the second stack has been stamped out.

A stacking apparatus of one embodiment according to the present invention includes, in a center of the rotating stage unit, a scrap discarding unit that discards
the first scrap portion cut off by the first cutting unit and
the second scrap portion cut off by the second cutting unit.

Moreover, a stack manufacturing system of one embodiment according to the present invention includes:

the stacking apparatus;

a first machining unit that machines the first stack to be pressed and stamped out of the first material to be stacked by the first press member; and a second machining unit that machines the second stack to be pressed and stamped out of the second material to be stacked by the second press member.

In a stack manufacturing system of one embodiment according to the present invention, the first machining unit machines the first hole, and the second machining unit machines the second hole.

In a stack manufacturing system of one embodiment according to the present invention, a direction in which the first machining unit conveys the first material to be stacked and a direction in which the second machining unit conveys the second material to be stacked are radially arranged about the scrap discarding unit.

Advantages of the Invention

According to the present invention, a stacking apparatus and a stack manufacturing system having high accuracy and productivity can be provided.

BEST MODE FOR CARRYING OUT THE INVENTION

Figure 1:
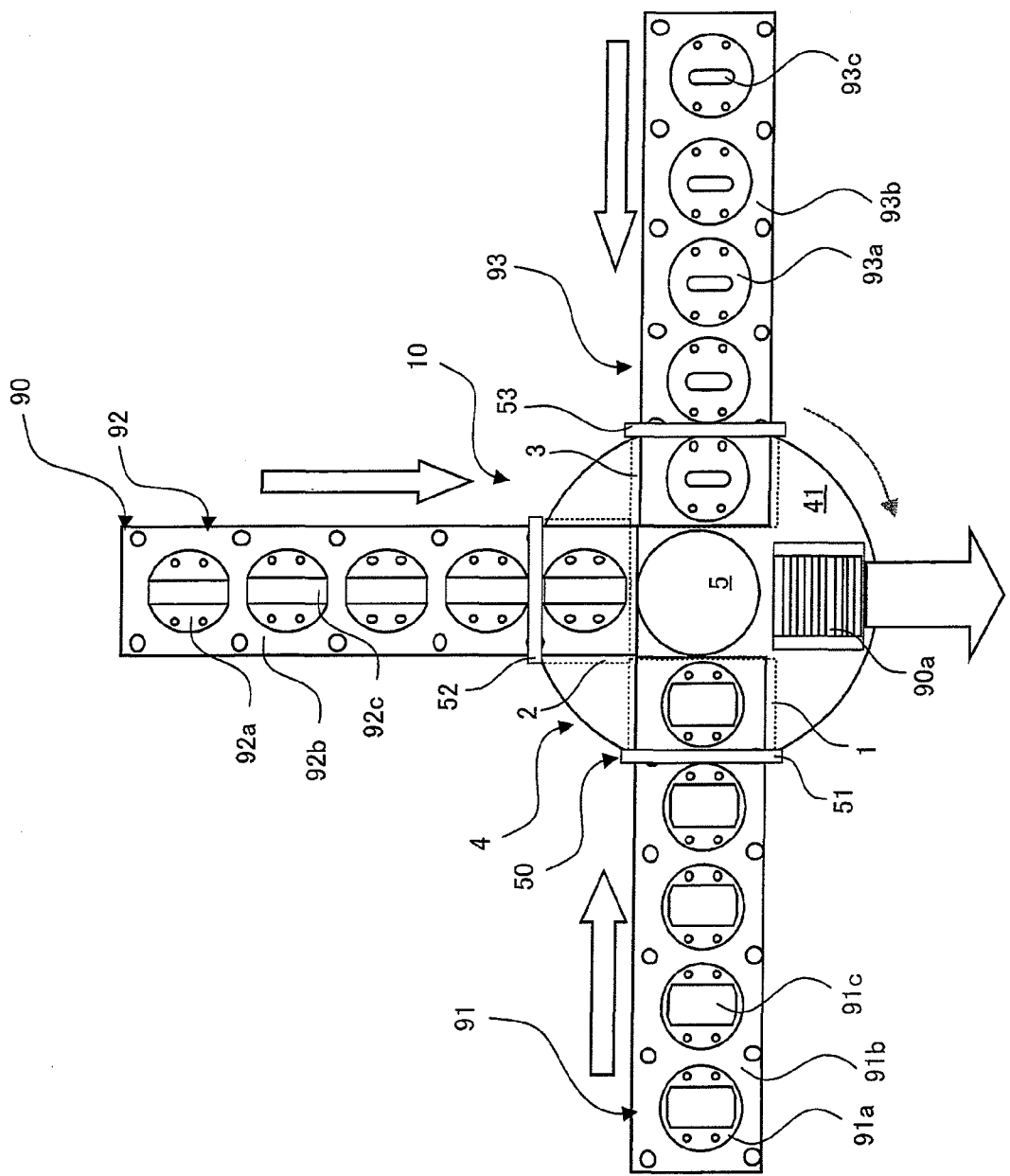
FIG. 1 is a schematic diagram showing a stacking apparatus of one embodiment according to the present invention.

FIG. 1 is a schematic diagram showing a stacking apparatus of one embodiment according to the present invention.

As shown in FIG. 1, the stacking apparatus 10 serving as an example of the present embodiment includes a first stacking unit 1, a second stacking unit 2, a third stacking unit 3, a rotating stage unit 4, and a scrap discarding unit 5.

The first stacking unit 1, the second stacking unit 2, and the third stacking unit 3 are parts that stack a first material to be stacked 91, a second material to be stacked 92, and a third material to be stacked 93, respectively. The rotating stage unit 4 is a part that rotates and moves stacks stacked by the first stacking unit 1, the second stacking unit 2, and the third stacking unit 3. The scrap discarding unit 5 is a part that is arranged in the center of the rotating stage unit 4 and discharges scraps after the lamination of the first material to be stacked 91, the second material to be stacked 92, and the third material to be stacked 93.

Since the stacking units 1, 2, and 3 each correspond to the lamination of one type of material to be stacked 90, at least one stacking unit has only to be provided. The stacking units 1, 2, and 3 may preferably be provided as many as corresponding to the types of materials to be stacked 90 that constitute a stack.

In such a manner, a plurality of stacking units can be provided to stack materials to be stacked having different thicknesses, materials to be stacked having different shapes, materials to be stacked of different substances, and the like by the respective stacking units. This enables manufacturing of a stack that includes stacks of different dimensions, different shapes, different substances, and the like.

The present embodiment deals with an example of forming a stack by using the first material to be stacked 91, the second material to be stacked 92, and the third material to be stacked 93. The stacking unit 10 therefore has only to include at least three stacking units, or the first stacking unit 1, the second stacking unit 2, and the third stacking unit 3.

Next, each part will be concretely described.

Figure 2:
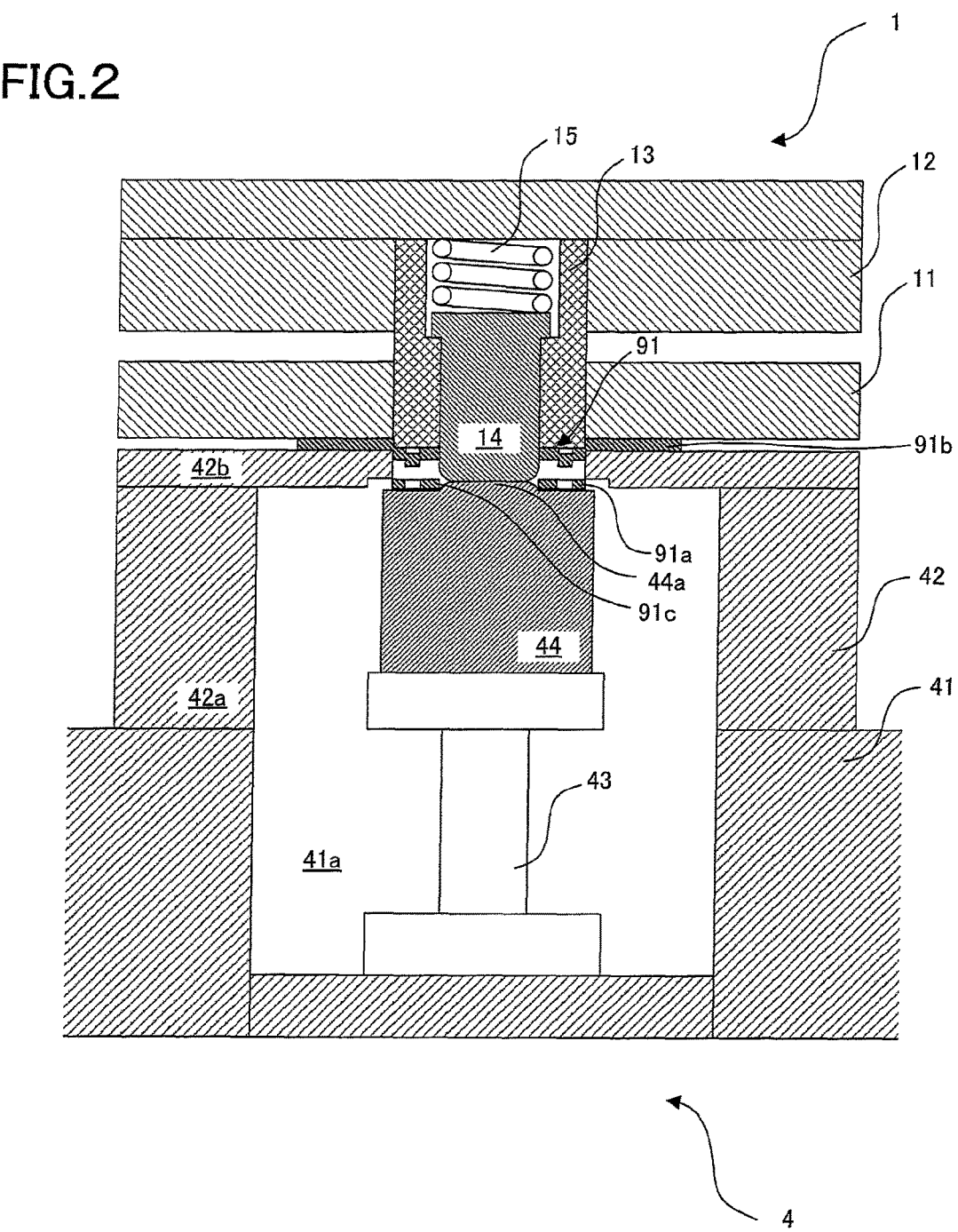
FIG. 2 is a diagram showing the vicinity of a first stacking unit of one embodiment according to the present invention.

FIG. 2 is a diagram showing the vicinity of the first stacking unit of one embodiment according to the present invention.

The rotating stage unit 4 includes a rotating table 41, a support stage 42, an actuator 43, and a guide base 44. The rotating table 41 is a member that has a horizontal flat surface of annular shape for the support stage 42 to be installed on and is rotatable about the center.

The support stage 42 is installed on the rotating table 41. The support stage 42 includes a support cylinder 42a of circular cylindrical shape and a disk unit 42b which is installed on the support cylinder 42a and has an opening in the center. The actuator 43 has an extendable structure and is installed on the rotating table 41. In the present embodiment, the actuator 43 is installed in a hole portion 41a formed in the rotating table 41 to increase the operating distance for which the actuator 43 extends and contracts.

The guide base 44 is arranged on the upper side of the actuator 43. The guide base 44 can be vertically moved by the actuator 43. A protrusion 44a is formed on the top surface of the guide base 44. The protrusion 44a protrudes by a dimension smaller than the thickness of the first material to be stacked 91.

As described above, the actuator 43 can vertically move the guide base 44. Even if the number of layers of the stack stacked on the guide base 44 increases, the position of the guide base 44 can be adjusted by operating the actuator 43 to extend or contract according to the number of layers of the stack on the guide base 44. This enables accurate lamination of the stack.

The rotating table 41 can be rotated to position the support stage 42, the actuator 43, and the guide base 44 to the first stacking unit 1, the second stacking unit 2, and the third stacking unit 3.

Note that the rotating table 41 may be provided with support stages 42, actuators 43, and guide bases 44 which are as many as corresponding to the stacking units. For example, in the present embodiment, at least three support stages 42, actuators 43, and guide bases 44 may be installed in a first position corresponding to the first stacking unit 1, a second position corresponding to the second stacking unit 2, and a third position corresponding to the third stacking unit 3. A backup support stage(s) 42, actuator(s) 43, and guide base(s) 44 may be provided. Note that the support stages 42, the actuators 43, and the guide bases 44 are preferably arranged uniformly at equal intervals in the circumferential direction so that the first position, the second position, the third position, and a backup position or positions are arranged uniformly at equal intervals in the circumferential direction.

If a plurality of support stages 42, actuators 43, and guide bases 44 are thus installed on the rotating table 41, the stacking units 1, 2, and 3 can simultaneously stack respective materials to be stacked 90 in a synchronized manner for efficient operation and improved productivity.

The first stacking unit 1 is a part that stacks the first material to be stacked 91. The first stacking unit 1 includes a first sandwiching member 11, a first press-holding member 12, a first press member 13, a first guide pin 14, and a first spring 15 serving as an elastic member.

The first sandwiching member 11 can be moved up and down along a not-shown support pole by a not-shown driving member. The first sandwiching member 11 and the support stage 41 can sandwich a first scrap portion 91*b* of the first material to be stacked 91 therebetween. The first press-holding member 12 holds the first press member 13. The first press-holding member 12 and the first press member 13 can be integrally moved up and down with respect to the first sandwiching member 11 along a not-shown support post by a not-shown driving member. The first press member 13 is a member that presses the first material to be stacked 91 to stamp out a first stack 91*a* from the first scrap portion 91*b*. The first guide pin 14 is inserted through the first press member 13 and can move up and down with respect to the first press member 13. The first guide pin 14 is passed through a first hole 91*c* formed in advance in the first material to be stacked 91 and guides the first material to be stacked 91 that is pressed and cut off by the first press member 13. The first spring 15 biases the first guide pin 14 against the first press-holding member 12 from above, and can elastically support the first guide pin 14 when the first press-holding member 12 is pressed from below.

With such a structure, the first guide pin 14 can accurately guide the first stack 91*a* pressed and stamped out of the first material to be stacked 91 by the first press member 13 onto a stack 90*a* which has already been stamped out and placed on the guide base 44. Note that the horizontal cross section of the first guide pin 14 is preferably shaped to correspond to the first hole 91*c* of the first stack 91*a*. If the horizontal cross section of the first guide pin 14 is configured to have a shape corresponding to the first hole 91*c* of the first stack 91*a*, the first guide pin 14 can more accurately guide the first stack 91*a* pressed and stamped out of the first material to be stacked 91 by the first press member 13.

Moreover, when stacking the first stack 91*a* onto the stack 90*a* which has already been stamped out and placed on the guide base 44, the first spring 15 can reduce the impact of collision of the first guide pin 14 with the guide base 44 or the stack 90*a*.

Note that the horizontal cross section of the protrusion 44*a* on the top surface of the guide base 44 is preferably shaped to correspond to the first hole 91*c* of the first stack 91*a*. If the horizontal cross section of the protrusion 44*a* is thus configured to have a shape corresponding to the first hole 91*c* of the first stack 91, the guide base 44 can stably hold the first stack 91*a* that is the first stamped out on the top surface.

Figure 3:
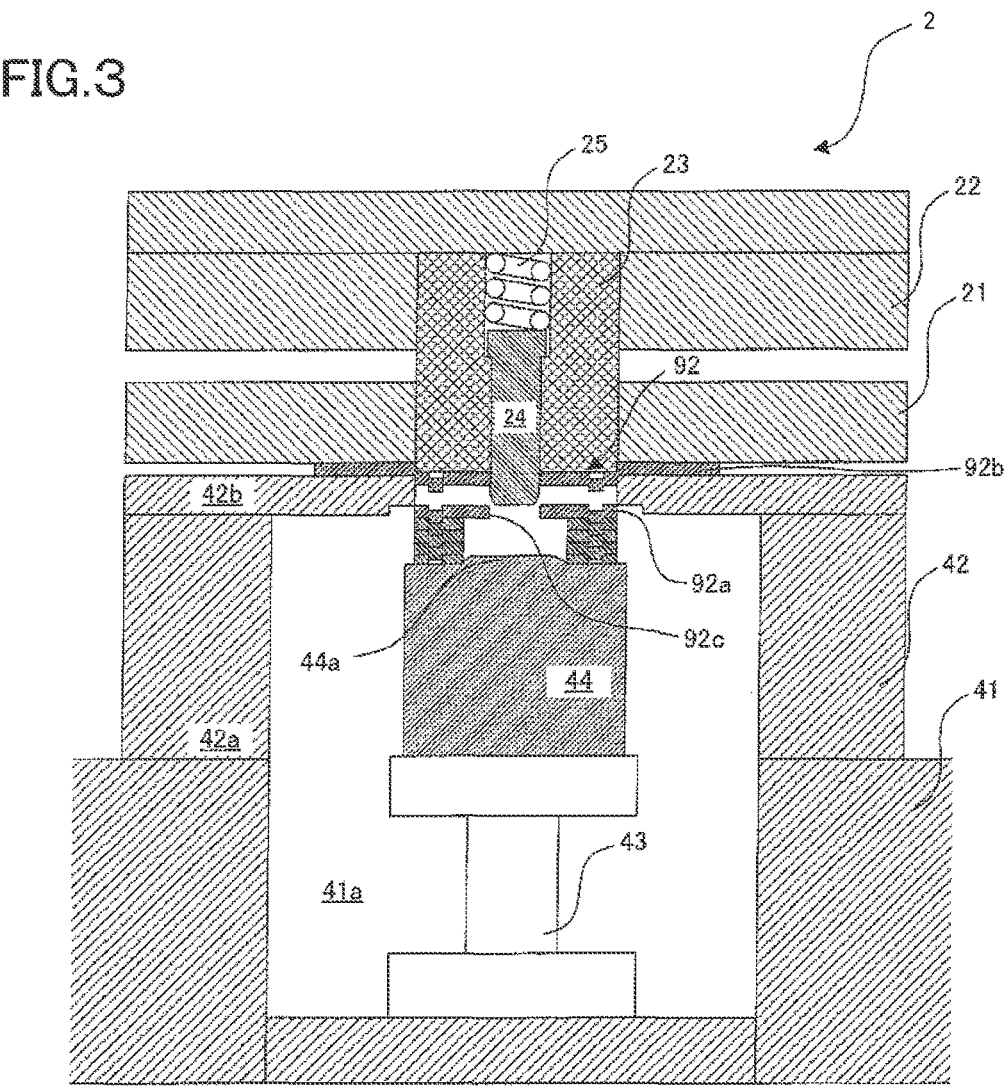
FIG. 3 is a diagram showing the vicinity of a second stacking unit of one embodiment according to the present invention.

FIG. 3 is a diagram showing the vicinity of the second stacking unit of one embodiment according to the present invention.

The rotating stage unit 4 is the same as in FIG. 2. A description thereof will thus be omitted.

The second stacking unit 2 is a part that stacks the second material to be stacked 92. The second stacking unit 2 includes a second sandwiching member 21, a second press-holding member 22, a second press member 23, a second guide pin 24, and a second spring 25 serving as an elastic member.

The second sandwiching member 21 can be moved up and down along a not-shown support post by a not-shown driving member. The second sandwiching member 21 and the support stage 42 can sandwich a second scrap portion 92*b* of the second material to be stacked 92 therebetween. The second press-holding member 22 holds the second press member 23. The second press-holding member 22 and the second press member 23 can be integrally moved up and down with respect to the second sandwiching member 21 along a not-shown support post by a not-shown driving member. The second press member 23 is a member that presses the second material to be stacked 92 to stamp out a second stack 92*a* from the second scrap portion 92*b*. The second guide pin 24 is inserted through the second press member 23 and can move up and down with respect to the press member 23. The second guide pin 24 is passed through a second hole 92*c* formed in advance in the second material to be stacked 92 and guides the second material to be stacked 92 that is pressed and cut off by the second press member 23. The second spring 25 biases the second guide pin 24 against the second press-holding member 22 from above, and can elastically support the second guide pin 24 when the second press-holding member 22 is pressed from below.

With such a structure, the second guide pin 24 can accurately guide the second stack 92*a* pressed and stamped out of the second material to be stacked 92 by the second press member 23 onto the stack 90*a* which has already been stamped out and placed on the guide base 44. Note that the horizontal cross section of the second guide pin 24 is preferably shaped to correspond to the second hole 92*c* of the second stack 92*a*. If the horizontal cross section of the second guide pin 24 is configured to have a shape corresponding to the second hole 92*c* of the second stack 92*a*, the second guide pin 24 can more accurately guide the second stack 92*a* pressed and stamped out of the second material to be stacked 92 the second press member 23.

Moreover, when stacking the second stack 92*a* onto the stack 90*a* which has already been stamped out and placed on the guide base 44, the second spring 25 can reduce the impact of collision of the second guide pin 24 with the guide base 44 or the stack 90*a*.

Figure 4:
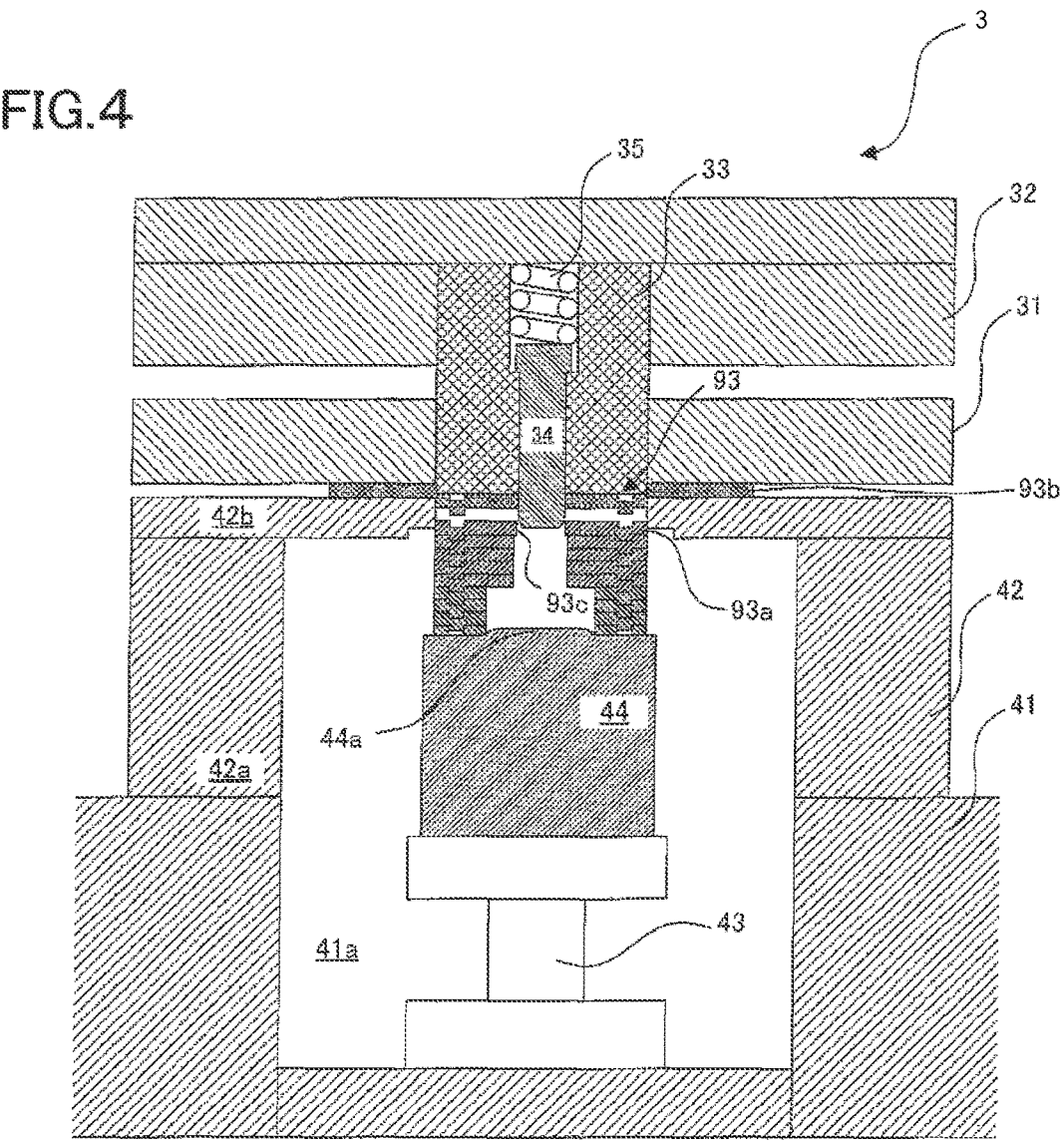
FIG. 4 is a diagram showing the vicinity of a third stacking unit of one embodiment according to the present invention.

FIG. 4 is a diagram showing the vicinity of the third stacking unit of one embodiment according to the present invention.

The rotating stage unit 4 is the same as in FIG. 2. A description thereof will thus be omitted.

The third stacking unit 3 is a part that stacks the third material to be stacked 93. The third stacking unit 3 includes a third sandwiching member 31, a third press-holding member 32, a third press member 33, a third guide pin 34, and a third spring 35 serving as an elastic member.

The third sandwiching member 31 can be moved up and down along a not-shown support post by a not-shown driving member. The sandwiching member 31 and the support stage 42 can sandwich a third scrap portion 93b of the third material to be stacked 93 therebetween. The third press-holding member 32 holds the third press member 33. The third press-holding member 32 and the third press member 33 can be integrally moved up and down with respect to the third sandwiching member 31 along a not-shown support post by a not-shown driving member. The third press member 33 presses the third material to be stacked 93 to stamp out a third stack 93a from the third scrap portion 93b. The third guide pin 34 is inserted through the third press member 33 and can move up and down with respect to the third press member 33. The third guide pin 34 is passed through a third hole 93c formed in advance in the third material to be stacked 93 and guides the third material to be stacked 93 pressed and cut out by the third press member 33. The third spring 35 biases the third guide pin 34 against the third press-holding member 32 from above, and can elastically support the third guide pin 34 when the third press-holding member 32 is pressed from below.

With such a structure, the third guide pin 34 can accurately guide the third stack 93a pressed and stamped out of the third material to be stacked 93 by the third press member 33 onto the stack 90a which has already been stamped out and placed on the guide base 44. Note that the horizontal cross section of the third guide pin 34 is preferably shaped to correspond to the third hole 93c of the third stack 93a. If the horizontal cross section of the third guide pin 34 is configure to have a shape corresponding to the third hole 93c of the third stack 93a, the third guide pin 34 can more accurately guide the third stack 93a pressed and stamped out of the third material to be stacked 93 by the third press member 33.

Moreover, when stacking the third stack 93a on the stack 90a which has already been stamped out and placed on the guide base 44, the third spring 35 can reduce the impact of collision of the third guide pin 34 with the guide base 44 or the stack 90.

Next, a method for operating the stacking apparatus 10 of one embodiment according to the present invention will be described. In the present embodiment, the basic methods for operating the first stacking unit 1, the second stacking unit 2, and the third stacking unit 3 are the same. The method for operating the second stacking unit 2 will thus be described, and a description of the methods for operating the first stacking unit 1 and the third stacking unit 3 will be omitted.

Figure 5:
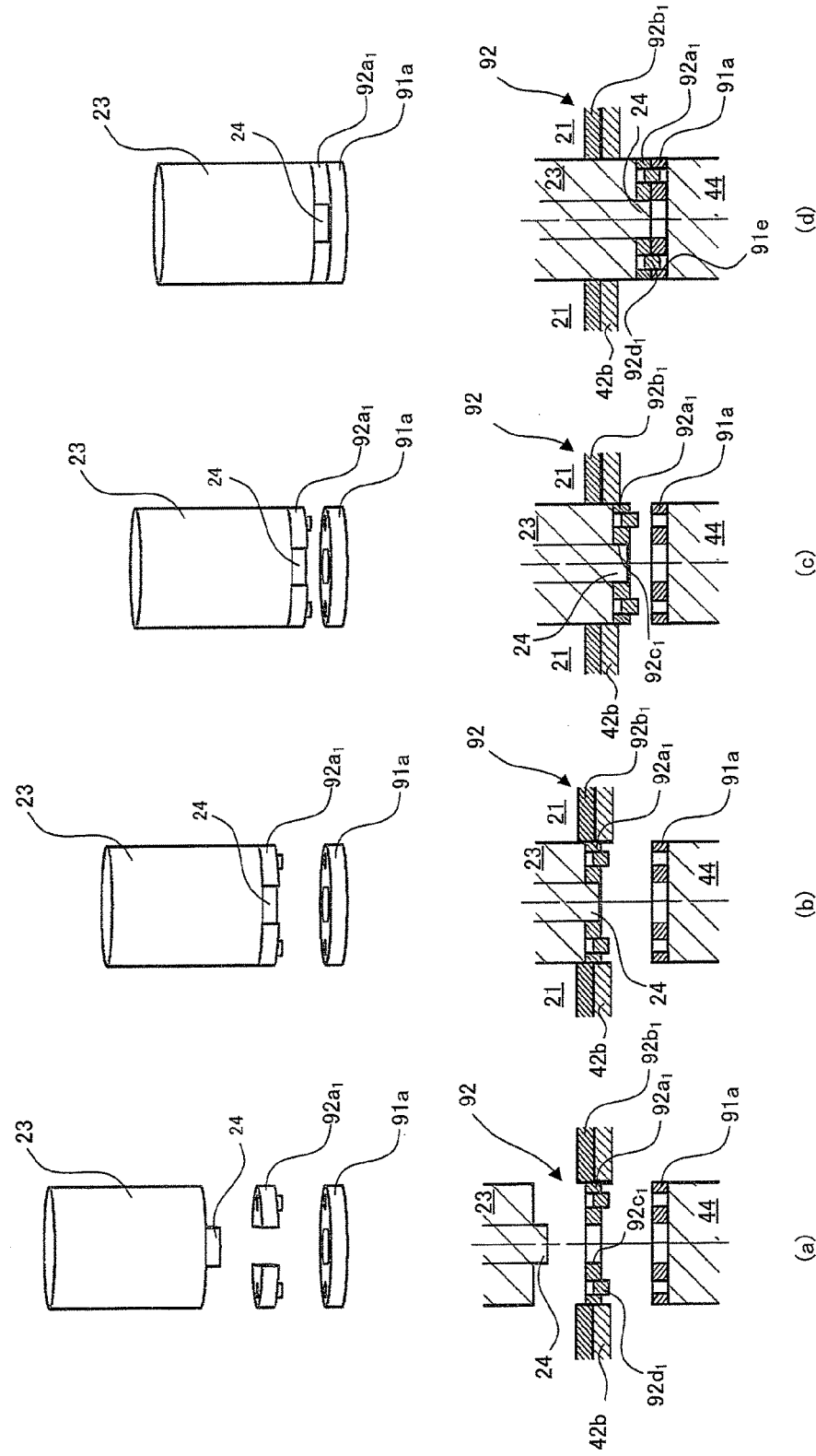
FIG. 5 is a diagram showing an operation of the second stacking unit of one embodiment according to the present invention.
Figure 6:
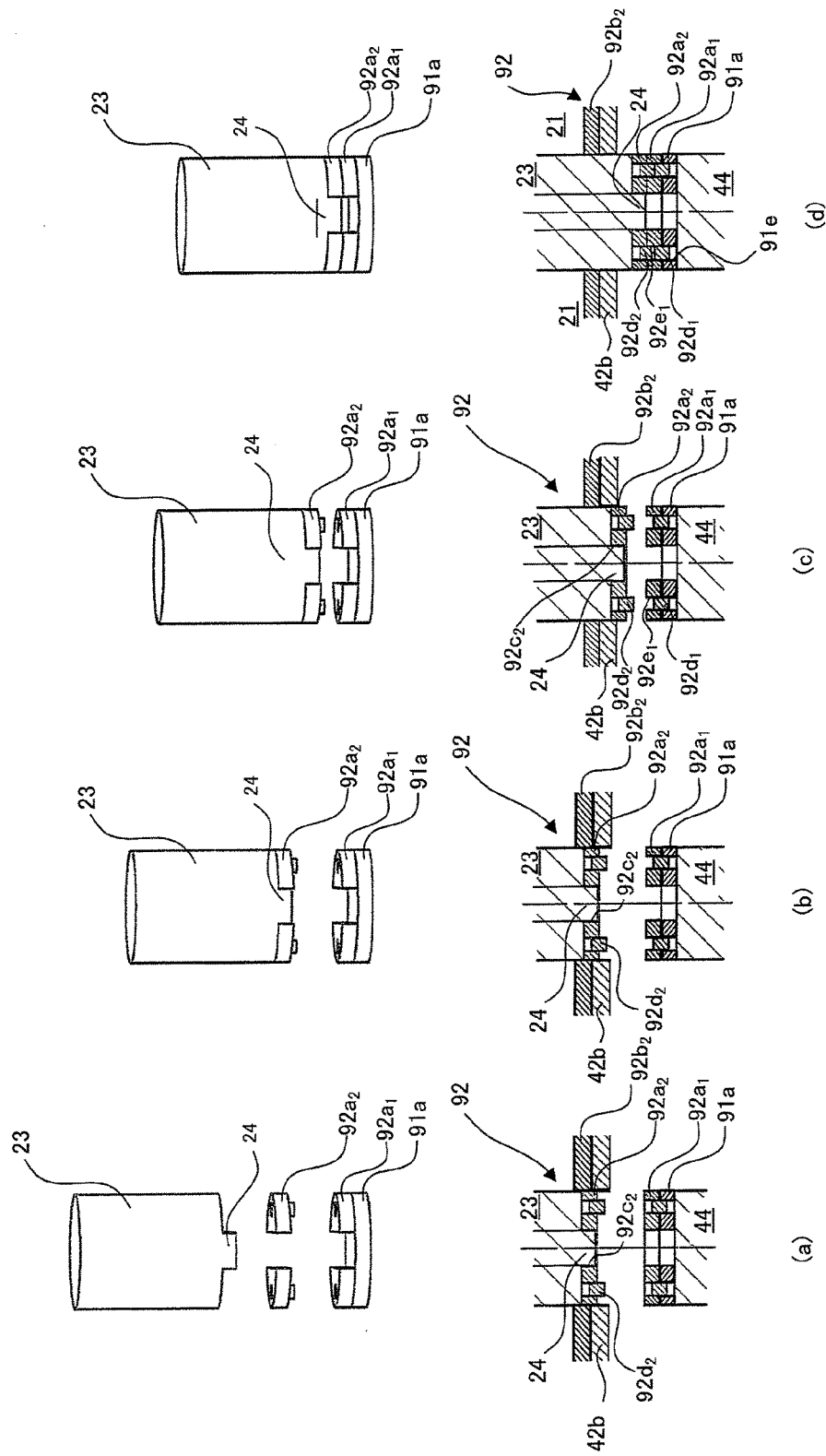
FIG. 6 is a diagram showing the operation of the second stacking unit of one embodiment according to the present invention.

FIGS. 5 and 6 are diagrams showing the operation of the second stacking unit 2 of one embodiment according to the present invention.

As shown in FIG. 5A, when the guide base 44 is rotated to the second stacking unit 2, a first stack 91a has already been stacked on the guide base 44. In FIGS. 5 and 6, the first stack 91a is shown as a single layer for the sake of simplification.

In the state of FIG. 5A, the second material to be stacked 92 is conveyed to the second stacking unit 2 and placed on the disk unit 42b. The second material to be stacked 92 of the present embodiment has been machined by this time to have dowel portions $92d_1$. The second material to be stacked 92 is preferably in a non-separating indentation machining state so-called half-punched in which at least part of the outer contour of a first layer of a second stack $92a_1$ is shaped in a state of being locked to a second scrap portion $92b_1$. Note that the second material to be stacked 92 may be without the outer contour of the second stack $92a_1$ machined.

In the state of FIG. 5B, the second scrap portion $92b_1$ of the second material to be stacked 92 is sandwiched between the second sandwiching member 21 and the disk unit 42b, and then the second press-holding unit 22 and the second press member 23 are moved down and the second press member 23 is in contact with the first layer of the second stack $91a_1$. The second guide pin 24 is inserted in the second hole $92c_1$ of the first layer of the second stack $92a_1$.

In the state of FIG. 5C, the second press member 23 moves down to stamp out the first layer of the second stack $92a_1$. The first layer of the second stack $92a_1$ moves down as guided by the second guide pin 24 inserted in the second hole $92c_1$.

In the state of FIG. 5D, the second press member 23 moves down further and the first layer of the second stack 92a1 is stacked on the first stack 91a. In the stacked state, the dowel portions $92d_1$ of the first layer of the second stack $92a_1$ are preferably fitted into dowel holes 91e of the first stack 91a. The fitting of the dowel portions $92d_1$ into the dowel holes 91e enables firm lamination.

After the state of FIG. 5D, the second press member 23 moves up. A portion of the second material to be stacked 92 corresponding to a second layer of the second stack $92a_2$ is then conveyed to the second stacking unit 2.

In the state of FIG. 6A, the second material to be stacked 92 is conveyed to the second stacking unit 2 and placed on the disk unit 42b. It should be appreciated that the second material to be stacked 92 is conveyed to the second stacking unit 2 as machined like the first layer.

In the state of FIG. 6B, the second scrap portion $92b_2$ of the second material to be stacked 92 is sandwiched between the second sandwiching member 21 and the disk unit 42b, and then the second press-holding member 22 and the second press member 23 are moved down and the second press member 23 is in contact with the second layer of the second stack $92a_2$ of the second material to be stacked 92. The second guide pin 24 is inserted in a second hole $92c_2$ of the second layer of the second stack $92a_2$.

In the state of FIG. 6C, the second press member 23 moves down to stamp out the second layer of the second stack $92a_2$. The second layer of the second stack $92a_2$ moves down as guided by the second guide pin 24 inserted in the second hole $92c_2$.

In the state of FIG. 6D, the second press member 23 moves down further and the second layer of the second stack $92a_2$ is stacked on the first layer of the second stack $92a_1$. In the stacked state, dowel portions $92d_2$ of the second layer of the second stack $92a_2$ are preferably fitted into dowel holes $92e_1$ of the first layer of the stack $92a_1$. The fitting of the dowel portions $92d_2$ into the dowel holes $92e_1$ enables firm lamination.

After the state of FIG. 6D, the second press member 23 moves up. A portion of the second material to be stacked 92 corresponding to a third layer of the second stack $92a_3$ is then conveyed to the second stacking unit 2.

When the lamination by the second stacking unit 2 ends, after the state of FIG. 6D, the second press member 23 moves up. The rotating stage unit 4 then rotates.

Figure 7:
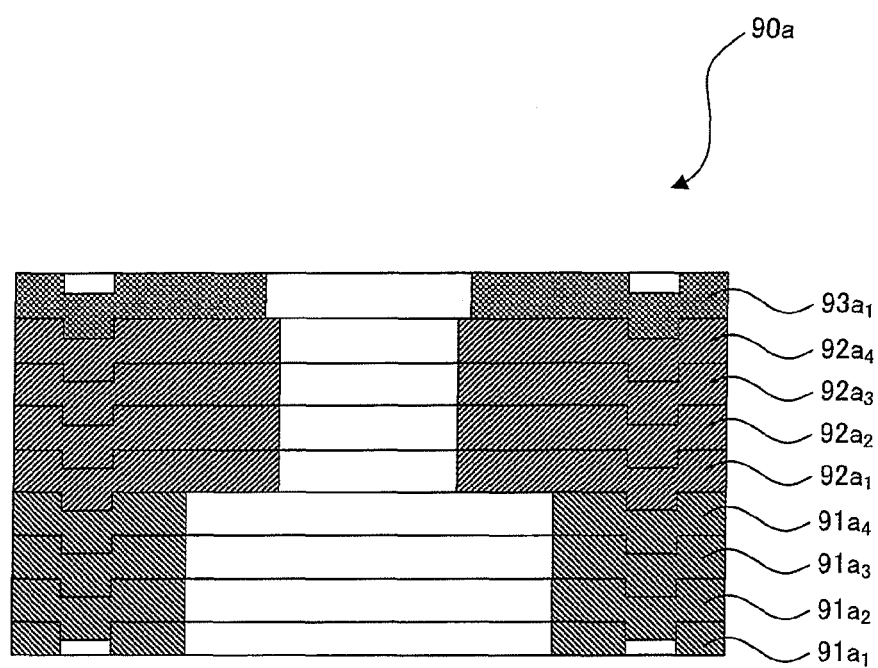
FIG. 7 is a diagram showing a stack stacked by the stacking apparatus of one embodiment according to the present invention.

FIG. 7 is a diagram showing a stack stacked by the stacking apparatus of one embodiment according to the present invention.

The stack 90a shown in FIG. 7 is completed by performing the steps shown in FIGS. 5 and 6 on the first stack 91a four times, the second stack 92a four times, and the third stack 93a once. Note that the numbers of layers of the first stack 91a, the second stack 92a, and the stack 93a are not limited to those of the present embodiment, and any numbers of layers may be stacked.

As shown in FIG. 1, the completed stack 90a is dropped down and discharged by activating the actuator 43 shown in FIGS. 2 to 4 to lift up the guide base 44. A contact member for making contact with the stack 90a to make the stack 90a drop down may be provided.

In the present embodiment, cutting units 50 shown in FIG. 1 are preferably used to discard the scrap portions 91b, 92b, and 93b after the lamination of the materials to be stacked 90. A first cutting unit 51 cuts off the first scrap portion 91b remaining after the lamination of the first stack 91a of the first material to be stacked 91 by the first stacking unit 1. The cut first scrap portion 91b is then discharged to the scrap discarding unit 5. A second cutting unit 52 cuts off the second scrap portion 92b remaining after the lamination of the second stack 92a of the second material to be stacked 92 by the second stacking unit 2. The cut second scrap portion 92b is then discharged to the scrap discarding unit 5. A third cutting unit 53 cuts the third scrap portion 93b remaining after the lamination of the third stack 93a of the third material to be stacked 93 by the third stacking unit 3. The cut third scrap portion 93b is then discarded to the scrap discarding unit 5.

The cutting units 50 can be provided to immediately cut off the scrap portions 91b, 92b, and 93b remaining after the lamination of the stacks 91a, 92a, and 93a by the stacking units 1, 2, and 3. This allows efficient operation and effective use of space. The provision of the scrap discarding unit 5 enables collection of the scrap portions 91b, 92b, and 93b occurring after the lamination to one place by small moving distances.

Next, a stack manufacturing system using the stacking apparatus will be described.

Figure 8:
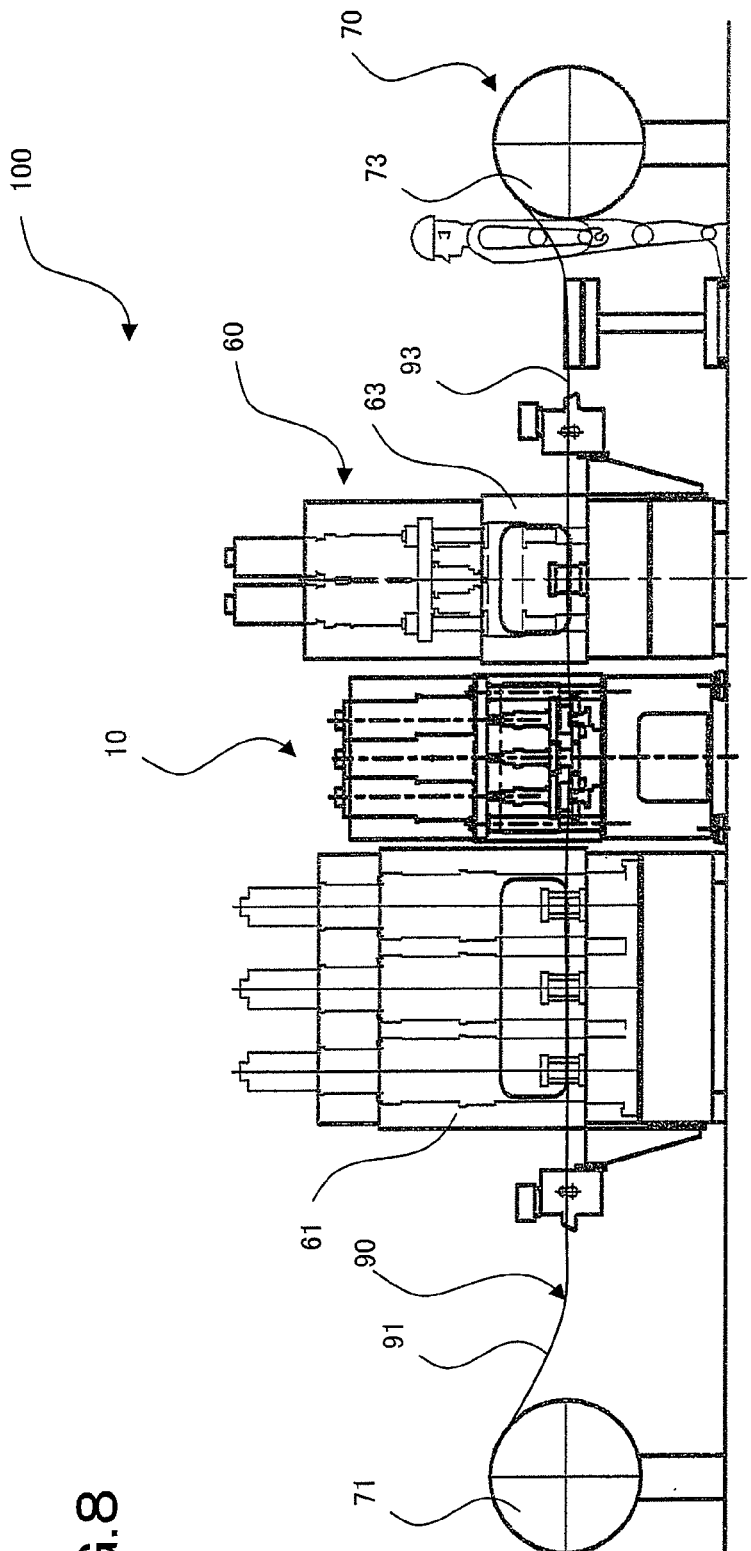
FIG. 8 is a front view showing a stack manufacturing system of one embodiment according to the present invention.
Figure 9:
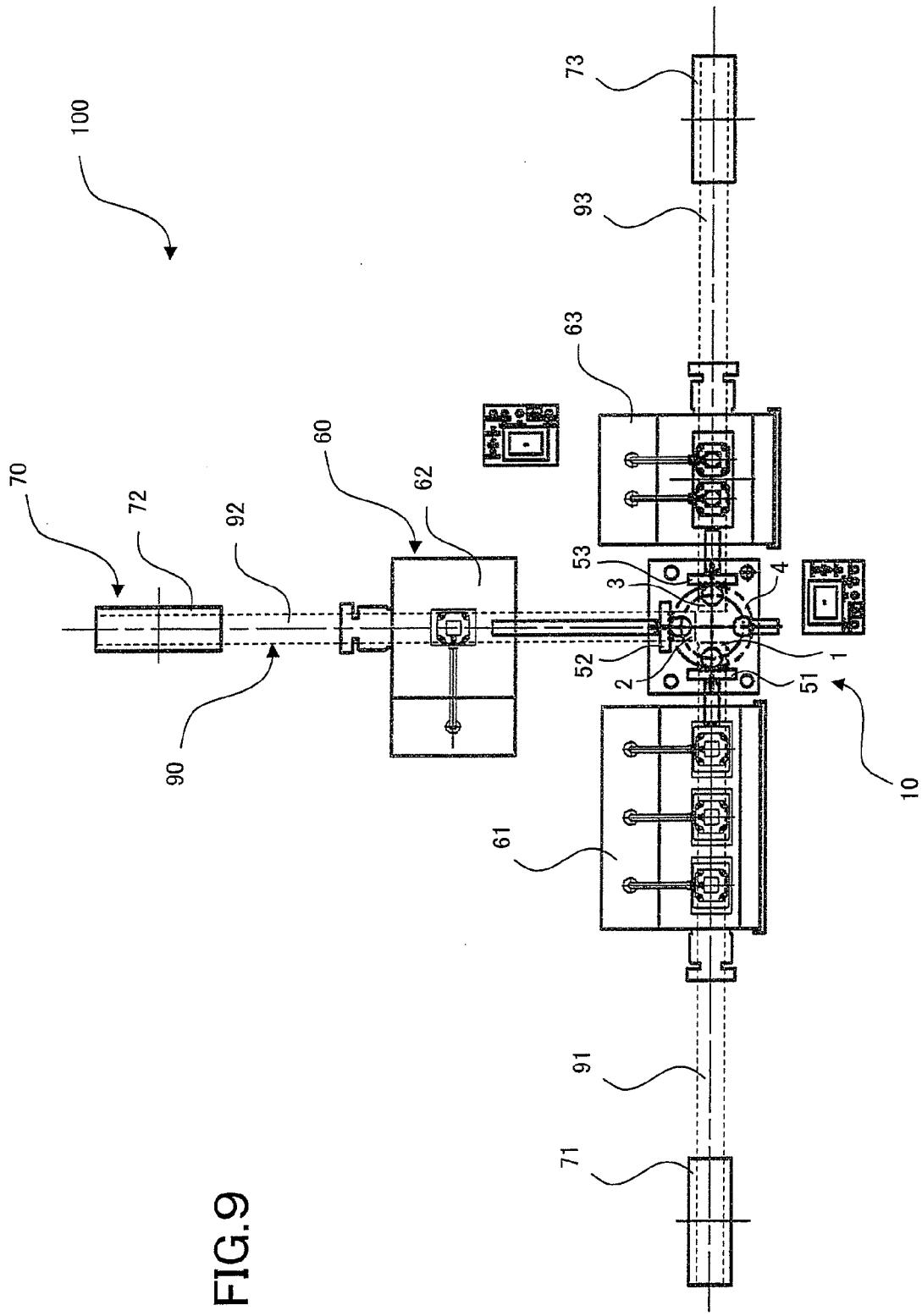
FIG. 9 is a plan view showing the stack manufacturing system of one embodiment according to the present invention.

FIG. 8 is a front view showing a stack manufacturing system of one embodiment according to the present invention. FIG. 9 is a plan view showing the stack manufacturing system of one embodiment according to the present invention.

The stack manufacturing system 100 includes the stacking apparatus 10, machining units 60, and to-be-stacked material installation units 70.

The to-be-stacked material installation units 70 are parts in which unprocessed materials to be stacked 90 are installed. The to-be-stacked material installation units 70 of the present embodiment use disc-like members around the outer peripheries of which the unprocessed materials to be stacked 90 are wound in a coil form.

The machining units 60 are units that machine the materials to be stacked 90 fed from the to-be-stacked material installation units 70. Like the technique described in Patent Literature 1, the machining units 60 progressively machine the fed materials to be stacked 90. The processing machines of the machining units 60 are not limited to press machines and may include a cutting machine and the like.

As for the numbers of machining units 60 and to-be-stacked material installation units 70, at least one machining unit 60 and at least one to-be-stacked material installation unit 70 have to be provided according to the lamination structure of the material(s) to be stacked 90. For example, if a stack is composed of a single member, one machining unit 60 and one to-be-stacked installation unit 70 may be used. If a stack is composed of five members, five machining units 60 and five to-be-stacked material installation units 70 may be used. The stacking apparatus 10 preferably includes stacking units 1, 2, and 3 as many as corresponding to the types of the materials to be stacked 90, i.e., the numbers of machining units 60 and to-be-stacked material installation units 70. Moreover, support stages 42, actuators 43, and guide bases 44 corresponding to the types of the materials to be stacked 90, i.e., the numbers of machining units 60 and to-be-stacked material installation units 70 are preferably arranged on the rotating table 41.

Next, a method for manufacturing a stack by the stack manufacturing system will be described.

Figure 10:
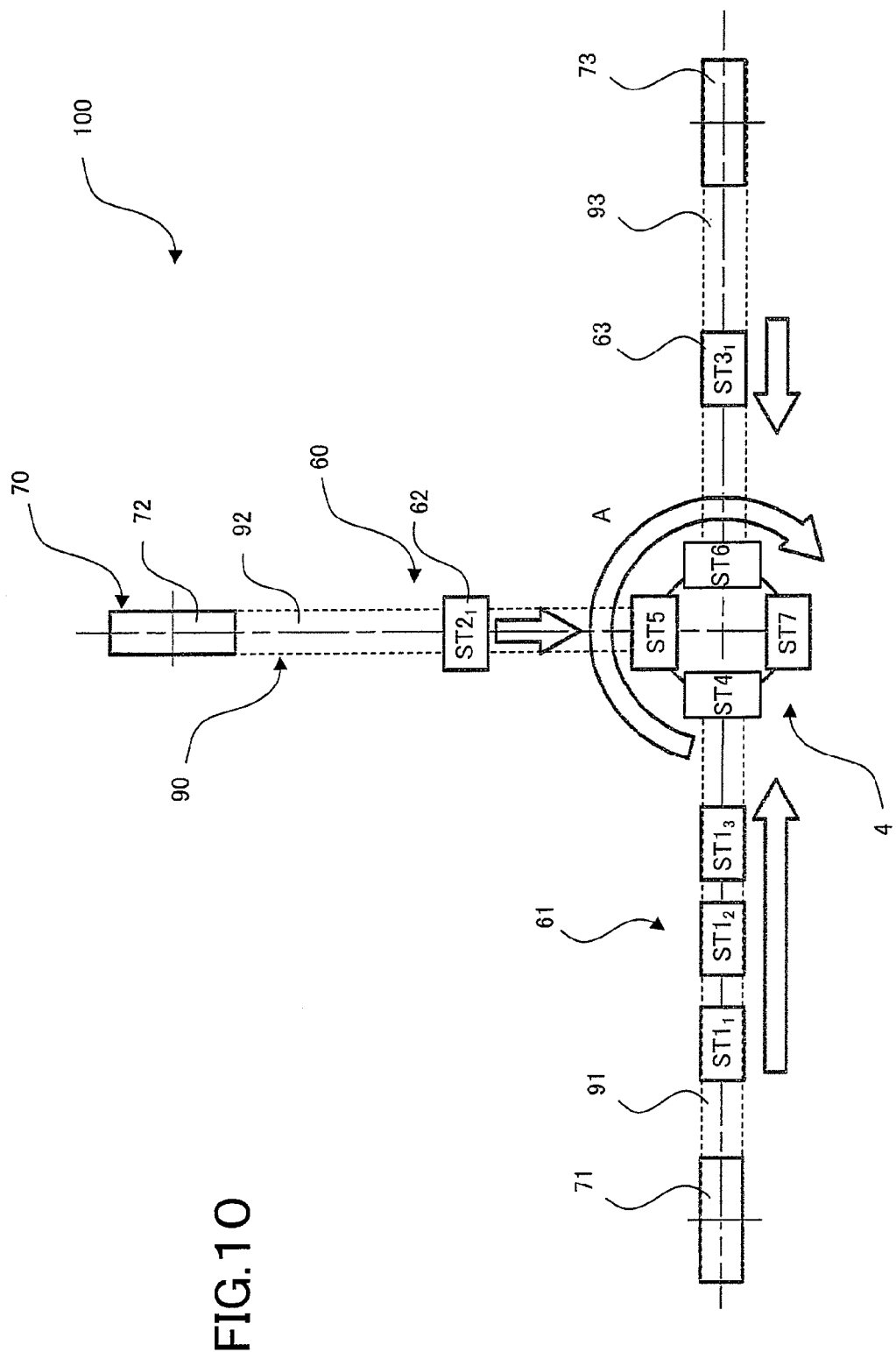
FIG. 10 is a diagram showing steps of the stack manufacturing system of one embodiment according to the present invention.

FIG. 10 is a diagram showing steps of the stack manufacturing system of one embodiment according to the present embodiment.

A first material to be stacked 91 is fed from a first to-be-stacked material installation unit 71 to a first machining unit 61. The first material to be stacked 91 is then machined by the first machining unit 61. In the present embodiment, three machining steps, or step $1_1$, step $1_2$, and step $1_3$, are performed ($ST1_1$, $ST1_2$, and $ST1_3$). The machined first material to be stacked 91 is then conveyed to the stacking apparatus 10.

Note that the first machining unit 61 of the first material to be stacked 91 preferably machines the first hole 91c to be guided by the first guide pin 14 in the first stacking unit 1. The first hole 91c preferably has the same shape as the horizontal cross section of the first guide pin 14, with the same or slightly larger dimensions.

As mentioned above, the final machining state of the first material to be stacked 91 in the first machining unit 61 is preferably a non-separating indentation machining state so-called a half-punched state in which at least part of the outer contour is shaped in a state of being locked to the first material to be stacked 91.

A second material to be stacked 92 is fed from a second to-be-stacked material installation unit 72 to a second machining unit 62. The second material to be stacked 92 is then machined by the second machining unit 62. In the present exemplary embodiment, a machining step of step $2_1$ is performed ($ST2_1$). The machined second material to be stacked 92 is then conveyed to the stacking apparatus 10.

Note that the second machining unit 62 of the second material to be stacked 92 preferably machines the second hole 92c to be guided by the second guide pin 24 in the second stacking unit 2. The second hole 92c preferably has the same shape as the horizontal cross section of the second guide pin 24, with the same or slightly larger dimensions.

As mentioned above, the final machining state of the second material to be stacked 92 in the second machining unit 62 is preferably a non-separating indentation machining state so-called a half-punched state in which at least part of the outer contour is shaped in a state of being locked to the second material to be stacked 92.

A third material to be stacked 93 is fed from a third to-be-stacked material installation unit 73 to a third machining unit 63. The third material to be stacked 93 is then machined by the third machining unit 63. In the present embodiment, a machining step of step $3_1$ is performed ($ST3_1$). The machined third material to be stacked 93 is then conveyed to the stacking apparatus 10.

Note that the third machining unit 63 of the third material to be stacked 93 preferably machines the third hole 93c to be guided by the third guide pin 34 in the third stacking unit 3. The third hole 93c preferably has the same shape as the horizontal cross section of the third guide pin 34, with the same or slightly larger dimensions.

As mentioned above, the final machining state of the third material to be stacked 93 in the third machining unit 63 is preferably a non-separating indentation machining state so-called a half-punched state in which at least part of the outer contour is shaped in a state of being locked to the third material to be stacked 93.

Note that the machining steps of the respective machining units 60 do not need to be performed in order of the first machining unit 61, the second machining unit 62, and the third machining unit 63. Pre-machined materials may be kept in the first stacking unit 1, the second stacking unit 2, and the third stacking unit 3.

Next, in step 4, the first stacking unit 1 stacks a first stack 91a (ST4). The rotating stage unit 4 is then rotated as shown by the arrow A. Next, in step 5, the second stacking unit 2 stacks a second stack 92a (ST5). The rotating stage unit 4 is then rotated as shown by the arrow A. Next, in step 6, the third stacking unit 3 stacks a third stack 93a (ST6). The rotating stage unit 4 is then rotated as shown by the arrow A. The stacking operations of the first stacking unit 1, the second stacking unit 2, and the third stacking unit 3 have already been described with reference to FIGS. 5 and 6. A description thereof will thus be omitted here.

Note that steps 4, 5, and 6 can be simultaneously performed in a synchronized manner if support stages 42, actuators 43, and guide bases 44 as many as or more than corresponding to the number of stacking units are arranged on the rotating stage unit 4 circumferentially at regular intervals according to the positions of the respective stacking units. Simultaneously performing steps 4, 5, and 6 in a synchronized manner can enhance the efficiency of operation and improve productivity.

Finally, in step 7, the completed stack 90a shown in FIG. 7 is discharged (ST7).

As described above, the stacking apparatus 10 according to one embodiment includes: the stage unit 4 on which the materials to be stacked are placed; the first sandwiching member 11 that is vertically movable with respect to the stage unit 4, and between which and the stage unit 4 the first material to be stacked 91 is sandwiched; the first press member 13 that is vertically movable with respect to the first sandwiching member 11 and presses the first material to be stacked 91; and the first guide pin 14 that guides the first stack 91a pressed and stamped out of the first material to be stacked 91 by the first press member 31. The first guide pin 14 therefore accurately guides the first stack 91a pressed and stamped out of the first material to be stacked 91 by the first press member 13 to the stage unit 4. This can improve accuracy and productivity.

In the stacking apparatus 10 according to one embodiment, the first guide pin 14 is inserted through the first hole 91c formed in the first stack 91a and guides the first stack 91a. This eliminates the need to provide guiding members in other portions and allows effective use of space.

The stacking apparatus 10 according to one embodiment includes the first spring 15 which elastically supports the first guide pin 14. When stacking the first stack 91a onto the stack 90a which has already been stamped out and placed on the guide base 44 of the rotating stage unit 4, the impact of collision of the first guide pin 14 with the guide base 44 or the stack 90a can thus be reduced.

The stacking apparatus 10 according to one embodiment includes: the rotating table unit 4 on which the first material to be stacked 91 is placed in the first position and the second material to be stacked 92 is placed in the second position; the first sandwiching member 11 that is vertically movable with respect to the rotating stage unit 4 in the first position, and between which and the rotating stage unit 4 the first material to be stacked 91 is sandwiched; the first press member 13 that is vertically movable with respect to the first sandwiching member 11 and presses the first material to be stacked 91; the first guide pin 14 that guides the first stack 91a pressed and stamped out of the first material to be stacked 91 by the first press member 13; the second sandwiching member 21 that is vertically movable with respect to the rotating stage unit 4 in the second position, and between which and the rotating stage unit 4 the second material to be stacked 92 is sandwiched; the second press member 23 that is vertically movable with respect to the second sandwiching member 21 and presses the second material to be stacked 92; and the second guide pin 24 that guides the second stack 92a pressed and stamped out of the second material to be stacked 92 by the second press member 23. The first guide pin 14 therefore accurately guides the first stack 91a pressed and stamped out of the first material to be stacked 91 by the first press member 13 to the rotating stage unit 4. The second guide pin 24 accurately guides the second stack 92a pressed and stamped out of the second material to be stacked 92 by the second press ember 23 to the rotating stage unit 4. This can improve accuracy and productivity.

In the stacking apparatus 10 according to one embodiment, the first guide pin 14 is inserted through the first hole 91c formed in the first stack 91a and guides the first stack 91a. The second guide pin 24 is inserted through the second hole 92c formed in the second stack 92a and guides the second stack 92a. This eliminates the need to provide guiding members in other portions and allows effective use of space.

The stacking apparatus 10 according to one embodiment includes: the first spring 15 that biases the first guide pin 14 toward the guide base 44; and the second spring 25 that biases the second guide pin 24 toward the guide base 44. When stacking the first stack 91a onto the stack 90a which has already been stamped out and placed on the guide base 44 of the rotating stage unit 4, the impact of collision of the guide pin 14 with the guide base 44 or the stack 90a can thus be reduced. When stacking the second stack 92a onto the stack 90a which has already been stamped out and placed on the guide base 44, the impact of collision of the second guide pin 24 with the guide base 44 or the stack 90a can thus be reduced.

The stacking apparatus 10 according to one embodiment includes: the guide base 44 on which the first stack 91a and second stack 92a stamped out are placed; and the actuator 43 that vertically moves the guide base 44. The first stack 91a and the second stack 92a can thus be retained with stability. Even if the number of layers of the stack stacked on the guide base 44 increases, the actuator 43 can be operated to extend or contact to adjust the position of the guide base 44 according to the numbers of layers of the first stack 91a and the second stack 92a on the guide base 44. The first stack 91a and the second stack 92a can thus be accurately stacked.

In the stacking apparatus 10 according to one embodiment, the rotating stage unit 4 includes at least two guide bases 44 and actuators 43. The stacking units 1, 2, and 3 can thus simultaneously stack the respective materials to be stacked 90 in a synchronized manner. This can enhance the efficiency of operation and improve productivity.

The stacking apparatus 10 according to one embodiment includes: the first cutting unit that cuts off the first scrap portion of the first material to be stacked from which the first stack has been stamped out; and the second cutting unit that cuts off the second scrap portion of the second material to be stacked from which the second stack has been stamped out. After the lamination of the stacks 91a, 92a, and 93a in the stacking units 1, 2, and 3, the remaining scrap portions 91b, 92b, and 93b can thus be immediately cut off. This allows efficient operation and effective use of space.

The stacking apparatus 10 according to one embodiment includes, in the center of the rotating stage unit, the scrap discarding unit that discards the first scrap portion cut off by the first cutting unit and the second scrap portion cut off by the second cutting unit. The scrap portions 91b, 92b, and 93b occurring after the lamination can thus be collected to one place by small moving distances for efficient disposal.

The stack manufacturing system 100 according to one embodiment includes: the stacking apparatus 10; the first machining unit 61 that machines the first stack 91a to be pressed and stamped out of the first material to be stacked 91 by the first press member 13; and the second machining unit 62 that machines the second stack 92a to be pressed and stamped out of the second material to be stacked 92 by the second press member 23. The first stack 91a and the second stack 92a can thus be machined with respective different dimensions, in different shapes, and of different substances immediately before lamination. This increases the degree of freedom in design, and enables prompt accommodation to changes in the dimensions, shapes, substances, and the like of the first stack 91a and the second stack 92a.

In the stack manufacturing system 100 according to one embodiment, the first machining unit 61 machines at least the first hole 91c in part of the first stack 91a. The second machining unit 62 machines at least the second hole 92c in part of the second stack 92a. The first guide pin 14 is inserted through the first hole 91c and guides the first stack 91a. The second guide pin 24 is inserted through the second hole 92c and guides the second stack 92a. The guiding holes can thus be machined during the machining steps, which allows efficient machining.

In the stack manufacturing system 100 according to one embodiment, the first material to be stacked conveyed from the first machining unit and the second material to be stacked conveyed from the second machining unit are radially arranged about the scrap discarding unit. This allows efficient operation and effective use of space.

EXPLANATION OF REFERENCE SYMBOLS

100: stack manufacturing system
10: stacking apparatus
1: first stacking unit
2: second stacking unit
3: third stacking unit
4: rotating stage unit
5: scrap discarding unit
60: machining unit
70: to-be-stacked material installation unit
90: material to be stacked

The invention claimed is:

1. A stacking apparatus comprising:
a stage unit on which a material to be stacked is placed;
a sandwiching member that is vertically movable with respect to the stage unit, and between which and the stage unit the material to be stacked is sandwiched;
a press member that is vertically movable with respect to the sandwiching member and presses the material to be stacked;
a guide pin, provided in the press member, that guides a stack pressed and stamped by the press member out of the material to be stacked; and
a guide base which receives the stack, and which has a protrusion protruding from an upper surface thereof, against which protrusion a surface of the guide pin presses.

2. The stacking apparatus according to claim 1, wherein the guide pin is inserted through a hole formed in the stack and guides the stack.

3. The stacking apparatus according to claim 1, comprising an elastic member that elastically supports the guide pin.

4. A stacking apparatus comprising:
a rotating stage unit on which a first material to be stacked is placed in a first position and a second material to be stacked is placed in a second position;
a first sandwiching member that is vertically movable at the first position and with respect to the rotating stage unit, and between which first sandwiching member and the rotating stage unit the first material to be stacked is sandwiched;
a first press member that is vertically movable with respect to the first sandwiching member and presses the first material to be stacked;
a first guide pin that guides a first stack pressed and stamped by the first press member out of the first material to be stacked;
a second sandwiching member that is vertically movable at the second position and with respect to the rotating stage unit, and between which second sandwiching member and the rotating stage unit the second material to be stacked is sandwiched;
a second press member that is vertically movable with respect to the second sandwiching member and presses the second material to be stacked;
a second guide pin that guides a second stack pressed and stamped by the second press member out of the second material to be stacked; and
wherein the rotating stage unit includes:
at least one guide base on which the first stack and the second stack stamped out are placed; and
an actuator that vertically moves the at least one guide base.

5. The stacking apparatus according to claim 4, wherein:
the first guide pin is inserted through a first hole formed in the first stack and guides the first stack; and
the second guide pin is inserted through a second hole formed in the second stack and guides the second stack.

6. The stacking apparatus according to claim 4, comprising:
a first elastic member that elastically supports the first guide pin; and
a second elastic member that elastically supports the second guide pin.

7. The stacking apparatus according to claim 4, wherein the at least one guide base has a protrusion protruding from an upper surface thereof.

8. The stacking apparatus according to claim 4, wherein the at least one guide base comprises at least a first guide base and a second guide base, and wherein the actuator vertically moves the first guide base, and wherein a further actuator is provided to vertically move the second guide base.

9. The stacking apparatus according to claim 4, comprising:
a first cutting unit that cuts off a first scrap portion of the first material to be stacked from which the first stack has been stamped out; and
a second cutting unit that cuts off a second scrap portion of the second material to be stacked from which the second stack has been stamped out.

10. The stacking apparatus according to claim 9, comprising, in a center of the rotating stage unit, a scrap discarding unit that discards
the first scrap portion cut off by the first cutting unit and the second scrap portion cut off by the second cutting unit.

11. A stack manufacturing system comprising:
the stacking apparatus according to claim 4;
a first machining unit that machines the first material to be stacked by the first press member; and
a second machining unit that machines the second material to be stacked by the second press member.

12. The stack manufacturing system according to claim 11, wherein:
the first machining unit machines a first hole; and
the second machining unit machines a second hole.

13. The stack manufacturing system according to claim 11, wherein a direction in which the first machining unit conveys the first material to be stacked and a direction in which the second machining unit conveys the second material to be stacked are radially arranged about a scrap discarding unit.

* * * * *